(12) United States Patent
Ahn et al.

(10) Patent No.: US 9,113,041 B2
(45) Date of Patent: Aug. 18, 2015

(54) DIGITAL BROADCAST RECEPTION APPARATUS AND METHOD OF PROVIDING ADDITIONAL CONTENT

(75) Inventors: Sung-wook Ahn, Seoul (KR); Gyung-pyo Hong, Yongin-si (KR); Kwang-hyuk Kim, Suwon-si (KR); Jin-yong Ahn, Suwon-si (KR); Hue-yin Kim, Seoul (KR); Young-suk Kim, Seongnam-si (KR); Hae-su Gwon, Gunpo-si (KR); Sang-woong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 977 days.

(21) Appl. No.: 12/370,002

(22) Filed: Feb. 12, 2009

(65) Prior Publication Data

US 2009/0205005 A1 Aug. 13, 2009

Related U.S. Application Data

(60) Provisional application No. 61/028,001, filed on Feb. 12, 2008.

(30) Foreign Application Priority Data

Dec. 12, 2008 (KR) .................. 10-2008-0126574

(51) Int. Cl.
*H04N 7/173* (2011.01)
*H04N 21/462* (2011.01)
(Continued)

(52) U.S. Cl.
CPC ....... *H04N 7/17318* (2013.01); *H04N 21/4622* (2013.01); *H04N 21/4722* (2013.01); *H04N 21/6543* (2013.01); *H04N 21/812* (2013.01); *H04N 21/8586* (2013.01)

(58) Field of Classification Search
CPC ............ H04N 21/235; H04N 21/4622; H04N 21/8586; H04N 5/44543; H04N 7/17318
USPC .............................. 725/34–36, 112–115, 135
See application file for complete search history.

(56) References Cited

U.S. PATENT DOCUMENTS 6,698,020 B1 * 2/2004 Zigmond et al. ............. 725/34
7,039,932 B2 * 5/2006 Eldering ....................... 725/35
(Continued)

FOREIGN PATENT DOCUMENTS

JP 2002-518946 A 6/2002
KR 10-2005-0101332 A 10/2005

OTHER PUBLICATIONS

Communication dated Sep. 25, 2014 issued by the Korean Intellectual Property Office in counterpart Korean Application No. 10-2008-0126574.
(Continued)

*Primary Examiner* — Hai V Tran
*Assistant Examiner* — Anthony Bantamoi
(74) *Attorney, Agent, or Firm* — Sughrue Mion, PLLC

(57) ABSTRACT

Disclosed is a method of providing additional content in a digital broadcast reception apparatus, the method including receiving a locator of additional content from a broadcast server while a user watches a broadcast program, receiving an instruction to insert the additional content from the broadcast server, receiving and reproducing the additional content from a content providing server designated by the locator, and switching back to the broadcast program. Thus, it is not necessary to allocate a separate channel and/or to switch channels for providing additional content.

20 Claims, 3 Drawing Sheets

(51) Int. Cl.
   *H04N 21/4722* (2011.01)
   *H04N 21/6543* (2011.01)
   *H04N 21/81* (2011.01)
   *H04N 21/858* (2011.01)

(56) References Cited

U.S. PATENT DOCUMENTS

| | | |
|---|---|---|
| 8,656,437 B2 | 2/2014 | Paxton et al. |
| 2002/0078220 A1* | 6/2002 | Ryan ............................ 709/231 |
| 2002/0104083 A1* | 8/2002 | Hendricks et al. .............. 725/34 |
| 2004/0034873 A1* | 2/2004 | Zenoni ......................... 725/135 |
| 2006/0218618 A1* | 9/2006 | Lorkovic ...................... 725/135 |
| 2006/0288363 A1* | 12/2006 | Kunkel et al. .................. 725/34 |

OTHER PUBLICATIONS

Communication dated Mar. 26, 2015 issued by Korean Intellectual Property Office in counterpart Korean application No. 10-2008-0126574.

* cited by examiner

DIGITAL BROADCAST RECEPTION APPARATUS AND METHOD OF PROVIDING ADDITIONAL CONTENT

CROSS-REFERENCE TO RELATED PATENT APPLICATION

This application claims priority from Korean Patent Application No. 10-2008-0126574, filed on Dec. 12, 2008, in the Korean Intellectual Property Office, and the benefit of U.S. Provisional Patent Application No. 61/028,001, filed on Feb. 12, 2008, in the U.S. Patent and Trademark Office, the disclosures of which are incorporated herein in their entirety by reference.

BACKGROUND OF THE INVENTION

1. Field of the Invention

The present invention relates to digital broadcast, and more particularly, to a digital broadcast reception apparatus for inserting and providing additional content, such as advertisements, during digital broadcasts and a method of providing additional content.

2. Description of the Related Art

Client-based digital program insertion (DPI) is a function in which a multi system operator (MSO) uses an application such as a target engine or a decision engine installed in a client device, such as a set-top box, to display particular advertisements during advertising time slots between broadcast programs.

An application performs advertisement insertion by using a channel switch function, which is a function for switching from a current broadcast channel to a channel via which an advertisement stream is transmitted, and the advertisement stream is transmitted from a headend in real time in the form of an MPEG-2 transport stream (TS). A channel switching process in a client device is complex and is performed by using large amounts of resources of the client device, and thus it takes at least around one second or two seconds to perform the channel switching process.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of providing additional content, such as advertisements, without switching channels while a user is watching digital broadcast.

According to an aspect of the present invention, there is provided a method of providing additional content in a digital broadcast reception apparatus, the method including receiving a locator of additional content from a broadcast server while a user watches a broadcast program, receiving an instruction to insert the additional content from the broadcast server, receiving and reproducing the additional content from a content providing server designated by the locator, and switching back to the broadcast program.

The reception and the reproduction of the additional content may include searching for the additional content by using an address of the content providing server and a file path of the additional content that are included in the locator.

The locator may include an identifier of a channel into which the additional content is to be inserted, and the search of the additional content may further include verifying whether the broadcast channel is a channel into which the additional content is to be inserted or not by using the locator.

The content providing server is a web server. The file path is in the form of URL (uniform resource locator) and includes at least one of an identifier of a channel to insert the additional content, a switch ID for identifying a switch from a broadcast program to advertisement content, and a filename of the additional content. The search of the additional content may include, if the broadcast channel is the same as a channel into which the additional content is to be inserted, searching for a file having the same file path in the content providing server.

The reception and the reproduction of the additional content may further include, if the additional content is not found in the content providing server, reproducing underlying additional content included in a content stream of the broadcast program.

The reception of the instruction may include receiving a DPI (digital program insertion) trigger from the broadcast server.

According to another aspect of the present invention, there is provided a computer readable storage medium having recorded thereon a computer program for executing the method of providing additional content.

According to another aspect of the present invention, there is provided a digital broadcast reception apparatus including a broadcast reception unit receiving data from a broadcast server, an additional content reception unit receiving data from a content providing server, a playback unit reproducing data received by the broadcast reception unit and the additional content reception unit, and a control unit, which, when a locator of additional content and an instruction to insert the additional content are received while a user watches a broadcast program, controls the additional content reception unit to receive the additional content designated by the locator and controls the playback unit to switch back to the broadcast program after reproducing the received additional content.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Certain exemplary embodiments of the present invention will now be described with reference to the attached drawings.

Figure 1:
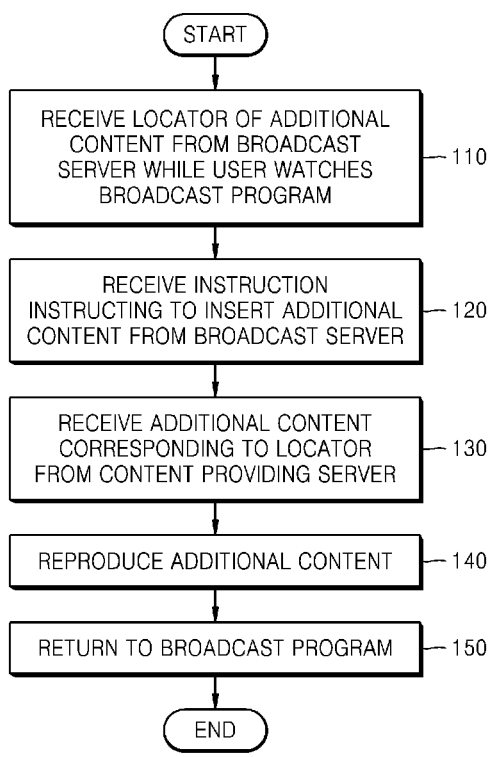
FIG. 1 is a flowchart of a method of providing additional content according to an exemplary embodiment of the present invention.

FIG. 1 is a flowchart of a method of providing additional content according to an embodiment of the present invention.

Referring to FIG. 1, while a user watches a broadcast program, a digital broadcast reception apparatus receives a locator of additional content to be inserted into the broadcast program of a particular channel (operation 110). At this point, the locator of additional content may be transmitted in a signal indicating that additional content such as an externally provided advertisement is to be inserted into a current channel.

The locator of additional content includes information for searching for additional content to be inserted, such as an address of a content providing server which provides additional content and file paths of additional content. Furthermore, the locator of additional content may include information regarding a broadcast channel to which additional content will be inserted, and information regarding a channel may be embodied in the form of a channel identifier. Furthermore, the locator of additional content may include information for identifying insertion of additional content, that is, identifying a switch from a current broadcast program to additional content, in a current channel. Furthermore, the locator of additional content may include the name of files corresponding to additional content. The channel information, the information for identifying insertion of additional content, and the filenames may be included in the locator of additional content in the form of pathnames of files and transmitted. In the case where a content providing server is a web server, locator of additional content may be generated in the form of uniform resource locator (URL).

When a digital broadcast reception apparatus is instructed by a broadcast server to insert additional content (operation 120), insertion of additional content begins. Insertion of additional content may be instructed by transmitting a digital program insertion (DPI) trigger. However, the present invention is not limited thereto, and various other methods such as a timeline method may be used.

Next, additional content is received from a content providing server designated by the locator of additional content (operation 130). The locator of additional content is used to search for additional content in a content providing server. If particular additional content corresponding to insertion instruction exists, the additional content is reproduced (operation 140). If particular additional content corresponding to insertion instruction is not found, underlying additional content included in a content stream of a current broadcast program is reproduced. For example, underlying advertisement included in a broadcast stream is reproduced.

In the case where a channel identifier is included in the locator of additional content, it is determined whether a channel designated by the channel identifier is the same as a current channel. If the channel designated by the channel identifier is the same as the current channel, that is, if the current broadcast channel is a channel into which additional content is to be inserted, the additional content is received and reproduced. If the channel designated by the channel identifier is different from the current channel, underlying additional content included in a content stream of a current broadcast program is reproduced.

When reproduction of additional content is completed, a current broadcast program is restored (operation 150).

According to the embodiment described above, a separate channel for additional content and channel switching for inserting additional content are not required, and thus additional content can be inserted precisely at an instructed time point without wasting resources. As a result, additional content can be provided without delay at a time point for inserting additional content and without any overlapping of additional contents and broadcast content.

Figure 2:
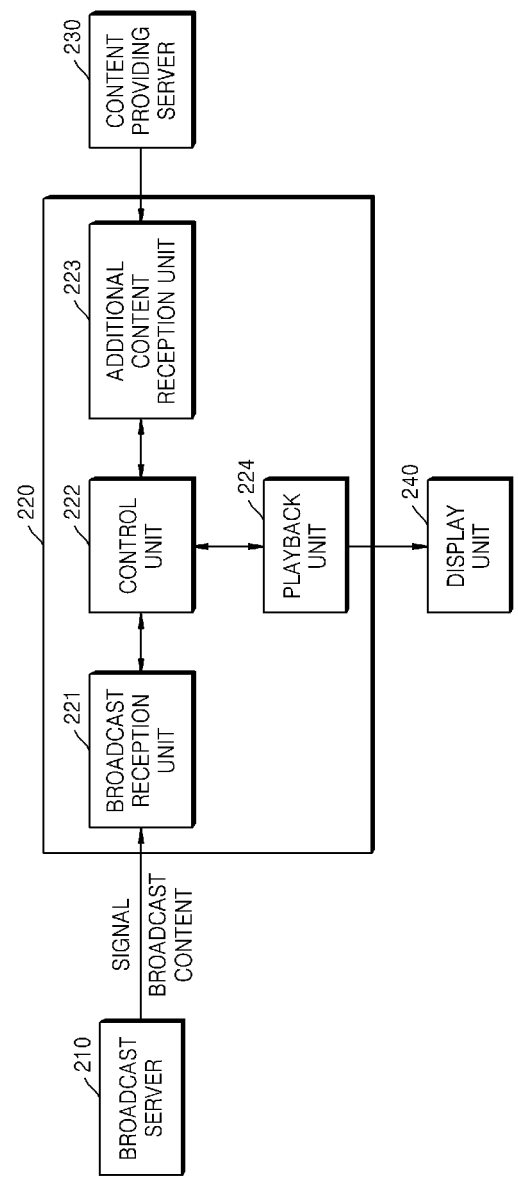
FIG. 2 is a block diagram of a digital broadcast reception apparatus according to another exemplary embodiment of the present invention.

FIG. 2 is a block diagram of a digital broadcast reception apparatus according to another embodiment of the present invention. Referring to FIG. 2, a digital broadcast reception apparatus 220 includes a broadcast reception unit 221, a control unit 22, an additional content reception unit 223, and a playback unit 224.

The broadcast reception unit 221 receives data, such as signals, broadcast content stream, etc., from a broadcast server 210. The additional content reception unit 223 receives additional content and data required for reproducing the additional content from a content providing server 230. The playback unit 224 reproduces a broadcast stream and additional content that are received via the broadcast reception unit 221 and the additional content reception unit 223. The control unit 222 controls the broadcast reception unit 221, the additional content reception unit 223, and the playback unit 224 to insert and reproduce additional content during playback of broadcast stream. When a locator of additional content and an instruction to insert additional content are received via the broadcast reception unit 221 while a user watches a broadcast program, the control unit 222 controls the additional content reception unit 223 to receive additional content designated by the locator, and controls the playback unit 224 to switch back to a current broadcast program after reproduction of the received additional content is completed.

Figure 3:
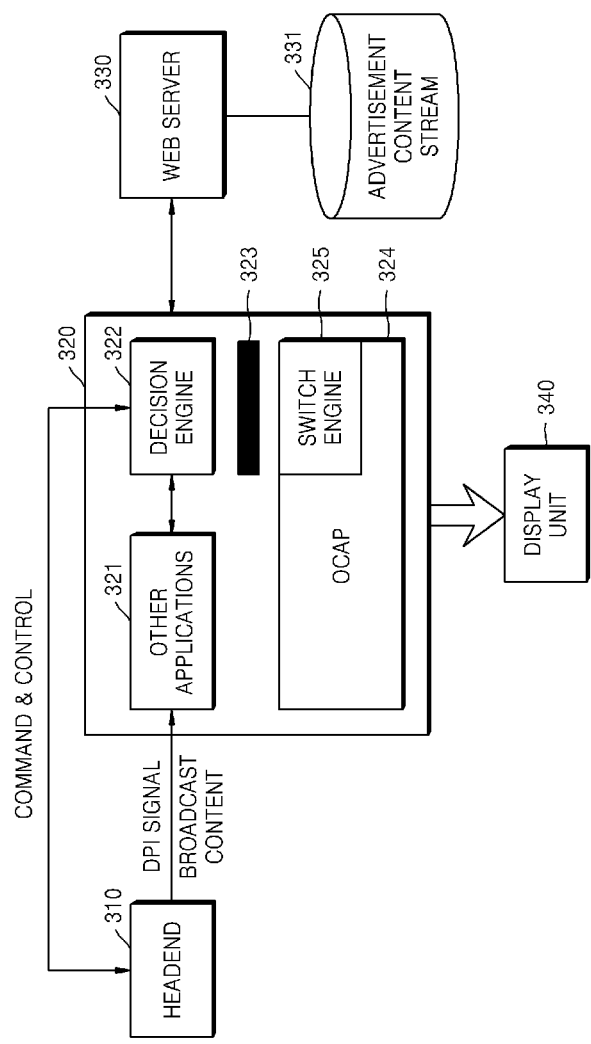
FIG. 3 is a block diagram of a digital broadcast reception apparatus according to another exemplary embodiment of the present invention.

FIG. 3 is a block diagram of a digital broadcast reception apparatus according to another embodiment of the present invention, illustrating an example where the present invention is applied to a host device employing an open cable application platform (OCAP).

Referring to FIG. 3, a host device 320 communicates not only with a headend 310, but also with a web server 330 providing advertisement for insertion, and includes a decision engine 322, other applications 321, an OCAP 324, a switch engine 325, and an OCAP DPI application programming interface (API) 323. Referring to FIG. 3, components for receiving broadcast and advertisement content and a component for reproducing content are omitted, and the decision engine 222, the OCAP 324, and the switch engine 325 act as the control unit 222 of FIG. 2.

The headend 310 of a multi system operator (MSO) uses the decision engine 322 via command & control, and the decision engine 322 performs channel switching and insertion of external advertisement by using the switch engine 325 embodied in the host device 320. The headend 310 transmits a transport stream to the host device 320, wherein the transport stream includes a DPI signalling and broadcast content.

The headend 310 includes a dpi_signalling_descriptor in the DPI informing the host device 320 that a DPI operation will occur in a current broadcast channel. The dpi_signalling_descriptor may include a locator of advertisement content to be inserted. The locator of advertisement content may include information regarding a channel to which advertisement content is to be inserted, a switch ID for identifying a switch from a current broadcast program to advertisement content, an address of a server providing advertisement content, file paths of advertisement content, etc. Furthermore, the locator of advertisement content may be generated in the form of a media URL indicating the location of advertisement content. The decision engine 322 generates a switch instruction object including the locator of advertisement content and transmits the switch instruction object to the switch engine 325 via OCAP DPI API 323. Accordingly, the headend 310 may control the host device 320 to provide different advertisements to different users in consideration of preferences of each of the users.

The switch engine 325 parses a switch instruction object and prepares to switch from a current broadcast program to advertisement content. At a time point for insertion of advertisement content, the headend 310 transmits a DPI trigger to the host device 320. When the DPI trigger is received, the switch engine 325 searches for advertisement content by using a locator of advertisement content, the locator obtained by parsing the switch instruction object. Format of the locator of advertisement content may be "transmission protocol// address of a content providing server//information indicating type of DPI operation//channel ID//switch ID/filename of advertisement content," for example. In correspondence thereto, a web server may manage advertisement contents for insertion in paths "\DPI\channel ID\switch ID\filename of advertisement content" in a file system to provide advertisement content designated by the headend 310. Here, it is assumed that advertisement content files stored in a web server are as following:

| \DPI- | \sourceID_1- | \switchID_1_1- | \InsertionAD_1_1_1.ts |
|---|---|---|---|
| | | | -\InsertionAD_1_1_2.ts |
| | | -\switchID_1_2- | \InsertionAD_1_2_1.ts |
| | | | -\InsertionAD_1_2_2.ts |
| | | | -\InsertionAD_1_2_3.ts |
| | -\sourceID_2 | -\switchID_2_1 | -\InsertionAD_2_1_1.ts |

In the case where a channel currently watched by a user is sourceID_1, a switch ID same as a switch ID switchID_1_1 of a switch instruction is searched for within the file system. If a corresponding switch ID is found, a file designated by media URL, which is a locator of a switch instruction, is searched for. For example, if the locator is as shown below, a corresponding advertisement content file InsertionAD_1_1_2.ts is received and reproduced.

http://168.219.190.78/DPI/sourceID_1/switchID_1_1/InsertionAD_1_1_2.ts

If no corresponding file is found, insertion of advertisement content is not executed, underlying advertisement content in a broadcast stream is reproduced, and error information is transmitted to the decision engine 322. Similarly, if no corresponding switch ID is found, underlying advertisement content in a broadcast stream is reproduced, and error information is transmitted to the decision engine 322.

When advertisement content is reproduced, either a web browser or a widget may be used to display the advertisement content on a display apparatus 340, but the present invention is not limited thereto.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention. Furthermore, the invention can also be embodied as computer readable codes on a computer readable storage medium. The computer readable storage medium is any data storage device that can store data which can be thereafter read by a computer system. Examples of the computer readable storage medium include read-only memory (ROM), random-access memory (RAM), CD-ROMs, magnetic tapes, floppy disks, and optical data storage devices. The computer readable storage medium can also be distributed over network coupled computer systems so that the computer readable code is stored and executed over a distributed computing system.

What is claimed is:

1. A method of providing additional content in a reception apparatus, the method comprising:
    receiving a locator of additional content from a broadcast server while a program is being viewed;
    receiving an instruction to insert the additional content from the broadcast server;
    receiving and reproducing by the reception apparatus the additional content from a content providing server designated by the received locator; and
    switching back to the program,
    wherein the instruction is a digital program insertion (DPI) trigger comprising a switch identifier, and
    the method further comprises:
        in response to detecting the receipt of the DPI trigger, extracting the switch identifier from the DPI trigger, and
        searching for the additional contents provided by an external apparatus using the locator based on match between the extracted switch identifier from the DPI trigger and the switch identifier in a DPI descriptor,
    wherein the DPI descriptor comprises the locator and the switch identifier.

2. The method of claim 1, wherein the receiving and the reproducing of the additional content comprises searching for the additional content by using the locator which comprises an address of the content providing server and a location identifier of the additional content.

3. The method of claim 2, wherein the locator comprises an identifier of a channel into which the additional content is to be inserted, said channel displaying the program being viewed, and
    the searching of the additional content further comprises verifying whether the channel is a channel into which the additional content is to be inserted or not by using the locator.

4. The method of claim 2, wherein the content providing server is a web server,
    the location identifier is in the form of uniform resource locator (URL) and comprises at least one of an identifier of a channel to insert the additional content, the switch identifier for identifying a switch from a broadcast program to advertisement content, and a file identifier of the additional content, and
    the searching of the additional content comprises, if the channel is the same as a channel into which the additional content is to be inserted, searching for a file having the same location identifier in the content providing server.

5. The method of claim 2, wherein the receiving and the reproducing of the additional content further comprises, if the additional content is not found in the content providing server, reproducing underlying additional content included in a content stream of the program.

6. The method of claim 1, wherein the receiving of the instruction comprises receiving the DPI trigger from the broadcast server.

7. A non-transitory computer readable storage medium having recorded thereon a computer program for executing the method of claim 1.

8. The method of claim 1, wherein the locator is provided in a DPI signaling provided with the broadcast content to a subscriber.

9. The method of claim 1, wherein the locator is received by the reception apparatus, from a headend, in a switch instruction object and wherein the reception apparatus switches between reproducing the broadcast program provided by the headend and the additional content provided by an additional content provider via Internet,
  wherein said content provider is identified in the locator along with the channel that reproduces the broadcast program.

10. The method of claim 9, wherein based on the locator, the reception apparatus determines whether to provide the additional content or underlying additional content provided with the broadcast program.

11. The method of claim 1, wherein the locator comprises a file identifier of the additional content.

12. The method of claim 1, wherein the locator comprises file paths of the additional content and names of files corresponding to the additional content provided by an additional content provider via Internet.

13. The method of claim 1, wherein the switch identifier identifies a channel that broadcasts the program, and
  the instruction to insert is the DPI trigger provided from the broadcast server such that each DPI trigger is transmitted separately at a time point when the additional content is to be provided instead of the broadcast program.

14. The method of claim 1, further comprising:
  comparing the extracted switch identifier from the DPI trigger with the switch identifier in the DPI descriptor, and
    searching for the additional contents provided by the external apparatus using the locator based on said comparing.

15. A reception apparatus comprising:
  a broadcast reception unit receiving data from a broadcast server;
  an additional content reception unit receiving data from a content providing server;
  a playback unit reproducing data received by the broadcast reception unit and the additional content reception unit; and
  a control unit, which, when a locator of additional content and an instruction to insert the additional content are received while a program is being viewed, in response to detecting receipt of the instruction to insert the additional content while the program is being viewed, controls the additional content reception unit to receive the additional content designated by the locator and controls the playback unit to switch back to the program being viewed after reproducing the received additional content,
  wherein the instruction is a digital program insertion (DPI) trigger comprising a switch identifier, and
  the control unit is further configured to:
    in response to detecting the receipt of the DPI trigger, extract the switch identifier from the DPI trigger, and
    search for the additional contents provided by an external apparatus using the locator based on match between the extracted switch identifier from the DDDDPI trigger and the switch identifier in a DPI descriptor,
    wherein the DPI descriptor comprises the locator and the switch identifier.

16. The reception apparatus of claim 15, wherein the control unit searches for the additional content by using the locator which comprises an address of the content providing server and a location identifier of the additional content.

17. The reception apparatus of claim 16, wherein the locator comprises an identifier of a channel into which the additional content is to be inserted, said channel displaying the program being viewed, and
  the control unit verifies whether the channel is a channel into which the additional content is to be inserted or not by using the locator.

18. The reception apparatus of claim 16, wherein the content providing server is a web server,
  the location identifier is in the form of uniform resource locator (URL) and comprises at least one of an identifier of a channel into which the additional content is to be inserted, the switch identifier for identifying a switch from the program to advertisement content, and a file identifier of the additional content, and,
  if the channel is the same as a channel into which the additional content is to be inserted, the control unit searches for a file having the same location identifier in the content providing server.

19. The reception apparatus of claim 16, wherein, if the additional content is not found in the content providing server, the control unit controls the playback unit to reproduce underlying additional content included in a content stream of the program.

20. The reception apparatus of claim 15, wherein the instruction to insert the additional content is the DPI trigger received from the broadcast server.

* * * * *